United States Patent
Woltjen et al.

[11] 3,850,051
[45] Nov. 26, 1974

[54] PRECISION FUNCTIONING VARIABLE SPEED INDEXING APPARATUS

[75] Inventors: Duane W. Woltjen, Manchester, Mo.; Donald E. Dillard, Granite City, Ill.; Thomas C. Kilwin, Bridgeton, Mo.

[73] Assignee: UMC Industries, Inc., St. Louis, Mo.

[22] Filed: Sept. 1, 1972

[21] Appl. No.: 285,849

[52] U.S. Cl. ............... 74/821, 74/813 C, 74/813 L, 74/823, 74/827
[51] Int. Cl. ............................................ B23b 29/32
[58] Field of Search ...... 74/821, 813 C, 813 L, 827, 74/823, 819, 815

[56] References Cited
UNITED STATES PATENTS
3,477,305  11/1969  McCartin .................... 74/827 X

*Primary Examiner*—Samuel Scott
*Assistant Examiner*—F. D. Shoemaker
*Attorney, Agent, or Firm*—Paul M. Denk

[57] ABSTRACT

In an indexing apparatus, a motor operates a mechanical indexing drive which imparts mechanically accelerated and decelerated turning to a table that is rotatably mounted upon a stationary base, and a series of switches responsive to various predetermined positions of the table effect a change in the speed of its turning, in addition to the speed change effected by the mechanical indexing drive, or momentarily initiate a halt in its rotation as when the table approaches the precise location of a work station. One of the switches is set to function in conjunction with the degrees of turn of the indexing table through a sector generally defined as the distance just short of the space between work stations, and when the first of the switches is actuated, it instructs the motor to reduce the input velocity of turning of the mechanical index drive, and the table then moves at a reduced speed into the position where it actuates a second switch, which may be described as a position sensitive switch that detects a suitable reference during this slow motion, and which momentarily deenergizes or dynamically brakes the motor thereby allowing the indexing drive to coast the table to an accurate positioning. Another braking device may be initiated after the table has coasted to a stop to fix the table stably in position during a machining operation. After momentary delay, a timing device once again deactivates the other braking device, and provides for a reenergization of the motor for again initiating a rapid turning of the indexing table toward another work station and a repeat of the foregoing cycle. The concept of this apparatus may be used in rotary indexing tables, or it may also be employed in any related type of indexing apparatus such as inline transfer machines, or the like.

16 Claims, 6 Drawing Figures

PRECISION FUNCTIONING VARIABLE SPEED INDEXING APPARATUS

BACKGROUND OF THE INVENTION

This invention relates to an indexing apparatus, but specifically pertains to an indexing table or machine which rapidly moves from approximately one work station to another but can be momentarily stopped precisely at the location of a work station for performance of a machine tool operation or other operations.

The prior art is replete with various forms of indexing apparatuses which, generally, provide for pivotal movement of a turntable that can then be stopped approximately at the location where a drill, mill, or other machine tool apparatus may be brought into working engagement with a component mounted upon the indexing table to be machined. Usually, these apparatuses are designed for periodic movement between work stations, and after the table has been pivoted for a certain distance, a switch is actuated for energizing a brake, such as a clutch means coupled to a motor for clamping of the table at an approximate location. While the basic principles of indexing might be achieved through these prior devices, usually precision and accuracy are sacrificed if the speed of the apparatus is reasonably swift, or where precision is necessary, then the speed of rotation of the indexing table is generally maintained at a low velocity. Heretofore these two attributes of indexing have been mutually exclusive in the same apparatus. Where a particular milling operation has to be performed, or a hole has to be drilled at an approximate location, usually the tolerances of these operations are gauged in terms of thousandths of an inch, which allows some higher velocity of pivot to be made of the turntable. But, where a machining operation has to be performed with precision, and use of this term is meant to infer that the operation must be performed within tolerances representative of a few arc-seconds of a degree, than previous indexing tables require turning at a much slower speed, or even by manual adjustment to the final degree of turn to provide for a precise setting.

In view of the foregoing, it is the principal object of this invention to provide what may be described as an intermittent indexing apparatus which desirably combines both speed and precision in its automatic operation.

It is another object of this invention to provide for a variable speed indexing apparatus which may rapidly move from one work station to just short of the next station and then decelerate in its velocity so as to slowly move the final degrees into a precision setting.

In view of the just previously discussed object of this invention, it is yet another object of this indexing apparatus to provide for automatic setting of an indexing table or inline machine to within tolerances defined in terms of arc-seconds.

An additional object of this invention is to provide cooperating switch means which regulate both the speed of turning of the indexing apparatus and precision stopping and locating of the indexing table at prearranged positions with accuracy.

Another object of this invention is the provision of unique brake means which structurally urges components of a stationary base into contact with a significant structural portion of the pivoting table for clamping the indexing table in place after it has become precisely positioned at a work station.

These and other objects of the invention will become more apparent to those skilled in the art in light of the following summary, and the description of the preferred embodiment in view of the drawings.

SUMMARY OF THE INVENTION

This invention, generally stated, includes an indexed portion including a rotatable indexing table that mounts to a stationary base, and the position in which the rotatably mounted table may undertake may be either horizontal, vertical or at an inclination depending upon the nature of the work to be performed through the use of the apparatus. But the principle of this invention may also be employed in an inline form of indexing apparatus as generally described in U.S. Pat. No. 3,682,005, and in addition, may be used in the type of flexible belt carrier mechanism shown in U.S. Pat. No. 3,636,783, both owned by a common assignee. But, for purposes of clarification, the indexing apparatus is hereinafter described and shown as comprising a horizontally disposed indexing table which is bearing mounted to said stationary base and which table is induced into rotation or to particular degrees of incremental pivot through the agency of a drive means, generally in the nature of a direct current, variable speed controlled motor, or fluid drive means or the like, or other motor-brake combinations. To add dynamic control to the precision operation of the indexing table, the drive means provides rotation for an indexing mechanism or drive, usually comprising a cam-follower combination which is operatively associated with the main shaft of the turntable. Obviously, to maintain precision movement, this main shaft, in addition to the other shafts provided in this apparatus, are all bearing mounted, properly lubricated, so as to minimize any loose tolerance operation and resultant error in their functioning, especially after sustained operation for any significant period of time.

The indexing table is disposed for turning in arc increments to any established degrees and can be precisionly set to function repeatedly within tolerances as close as five arc-seconds, and maintain this accurate operation even though the table can be moved from one work station to another at elevated velocity as great as 100 revolutions or greater per minute. Thus, the combination of accuracy and speed which are the two essential criteria always desired from automatic machine tool operations have been designed into the principle of this indexing apparatus.

To achieve both the foregoing precision functioning and high velocity operating of this apparatus, there is incorporated into this structure the predetermined actuation of a series of switch means, in addition to a motor braking arrangement which is designed to function instantly to effectively stop the drive means and set the table at precise locations. In other indexing apparatuses, the final adjustment of the indexing table into a precise setting usually must be performed manually, thereby requiring the use of manpower, labor and time, in addition to injecting the element of human error into the indexing operation.

But, the primary operation of this invention is to selectively utilize a first switch means to reduce from a rapid speed to a slower speed of functioning of the drive means to the indexing mechanism of the work supporting table, belt, or the like, and through the positioning of a displacement detecting second switch means which when actuated instructs said drive means to instantly shut off, thus allowing the indexing drive to coast the table at a precise position of stoppage, or alternatively, to simultaneously actuate a brake on the drive means for extremely precise positioning of the table. The rotational speed of the table is first reduced by reducing the speed of the drive means by actuation of said first switch means for the purpose of maximizing precision positioning of the table. Since the reduced speed or velocity at which the table moves after actuation of the first switch means is always at a slow constant speed, the indexing drive will always stop further movement of the table at the same and precise distance, thereby allowing for accurate setting up of work stations at finite and precise locations. Then, after completing stoppage, a second brake means which is designed and placed to function at a position where it influences the entire table symmetrically with respect to its axis of rotation, may be energized to clamp and fix the table or belt firmly while an operation is being performed.

While the present table may swiftly rotate from one work station to another at speeds approximating a high velocity, as it approaches the next desired work setting, a first switch means comprising a camming device which may mount directly to the aforesaid table shaft triggers a limit switch which reduces the speed of operation of the drive means and thereby reduces the high velocity of movement of the table to a constant creep speed that further slows the table for gradual movement the final few degrees into a precise setting. This creep speed may be somewhere an the order of less than 25 revolutions per minute and is at least at a slow enough speed that it eliminates the possibility that the table will have a tendency to overrun the precise setting at the location of the next established work station. The first switch means may be constructed in the form of a cam and follower combination that operates in conjunction with the quantity of turn of the first shaft or camshaft driven by the drive means, and as can be determined through this arrangement, any form of a camming surface may be adopted to provide actuation of the switch at a given moment to provide for reduction in the speed of turning of the indexing table, or other indexing member, at any degree around its circumference. Once the table has been reduced in speed, a second switch means cooperates with the relative positioning of the table with respect to its base, so that this switch, which is stably mounted to said base, may be actuated through contact with a positioned rod means depending from the table to provide for precise actuation of said switch at the exact instant desired for the table movement to be entirely stopped. A second brake means that is also cooperative between the indexing table and the stationary base to which it rotatably mounts may clamp the table in place after it has coasted to a stop or stopped on its own due to the mechanical bearing friction of the indexing drive or stopped by means of a brake on the drive means. Obviously, the circuitry of this apparatus is designed to provide for selective and sequential functioning of the dynamic motor-braking means.

The second or mechanical braking means has been designed to provide for uniformity of braking forces so that as the brake is actuated, the indexing table position is not altered. Obviously, in those indexing tables where there might be work parts clamped at various work stations around its periphery to be subjected to the operations of machine tools, there is a tendency of the indexing table through forces from machining operations or other operations to move elastically from the precision setting. This is particularly true in those indexing apparatuses that utilize one form of braking means that clamps the drive shaft of the table per se or the drive means itself. To overcome this problem, the present invention places the brake means radially around the circumference of the table near its outer periphery, outwardly of its central axis, and thereby provides for symmetry in holding the table at that location which most effectively counteracts the forces effecting the table. More specifically, this brake means has been designed in the form of a first sleeve that projects integrally upwardly from the stationary base, this sleeve being annular of design, and which is disposed just adjacent to and contiguous with the surface of a second sleeve, with said second sleeve being rigidly connected to the turntable itself. Then, through the cooperation of fluid pressure, as in the nature of a brake fluid, acting upon an annular brake like shoe or shim that is flexibly mounted to the first sleeve, said shim may be urged into frictional contact against the surface of said table sleeve and provide rigid support of the turntable. In expanding the annular brake shoe or shim into contact, advantage is taken of the elasticity of the material which is metallic in the preferred embodiment.

Through use of this form of an indexing apparatus utilizing the dual switch variable speed principle, through the conduct of tests, a prototype of this indexing apparatus has been repeatedly operated and stopped at predetermined work stations consistently within tolerances of approximately 5 arc-seconds. And, even where the dynamic braking of the drive means is not employed, the apparatus still operates within approximately the same tolerances due to the ability of the indexing drive to coast the table to a stop from a constant creep speed. This type of tolerance in an indexing apparatus, which may also operate its work table at high speeds, is a desirable addition to the indexing art. It might be stated that more accurate indexing movement can be attained by this system than by mechanical indexing alone, while at the same time being able to maintain the advantages of mechanically controlled motion.

BRIEF DESCRIPTION OF THE DRAWINGS

In the drawings, FIG. 1 provides a partial perspective and schematic view of the indexing apparatus of this invention.

DESCRIPTION OF THE PREFERRED EMBODIMENT

Figure 1:
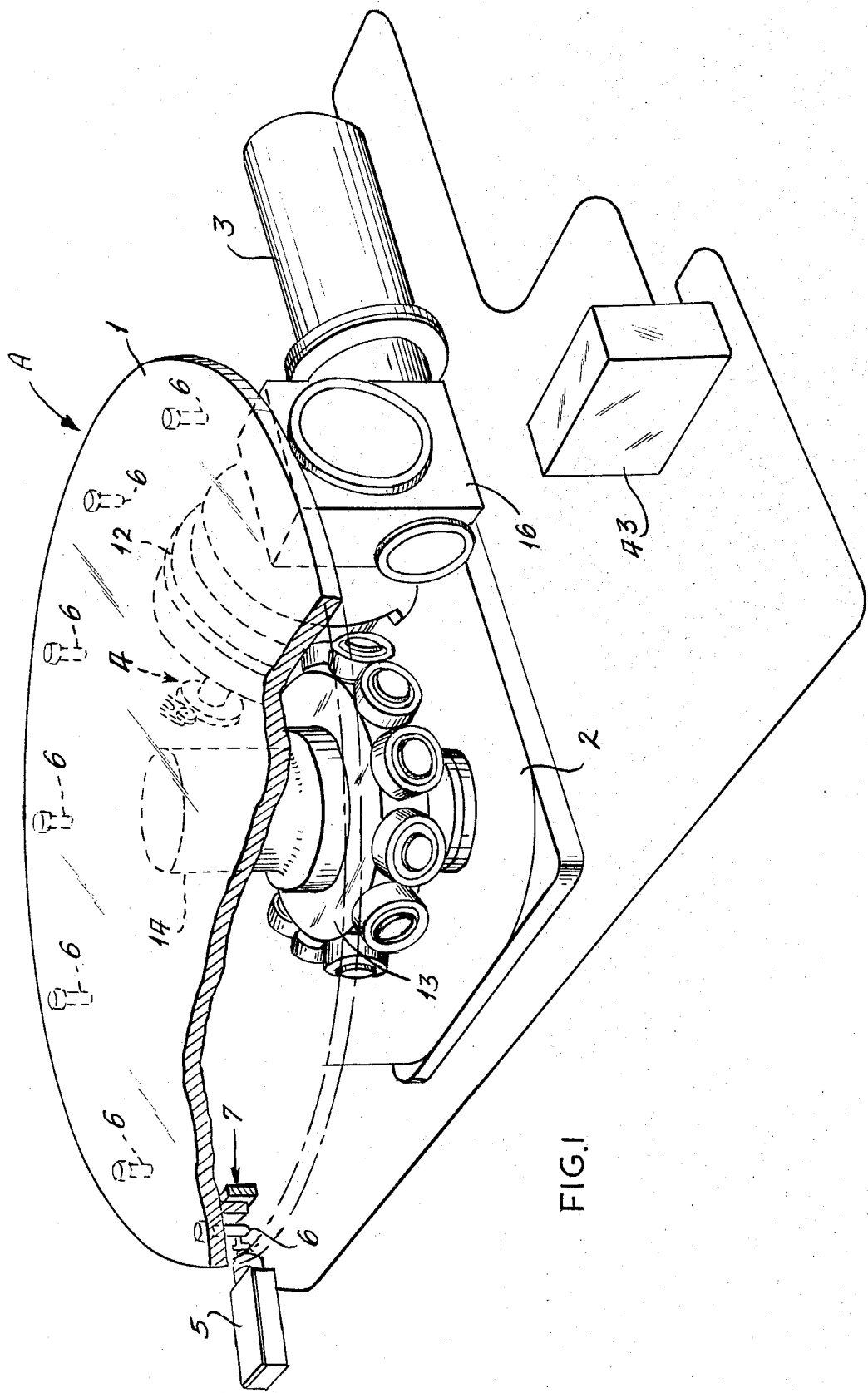
Figure 2:
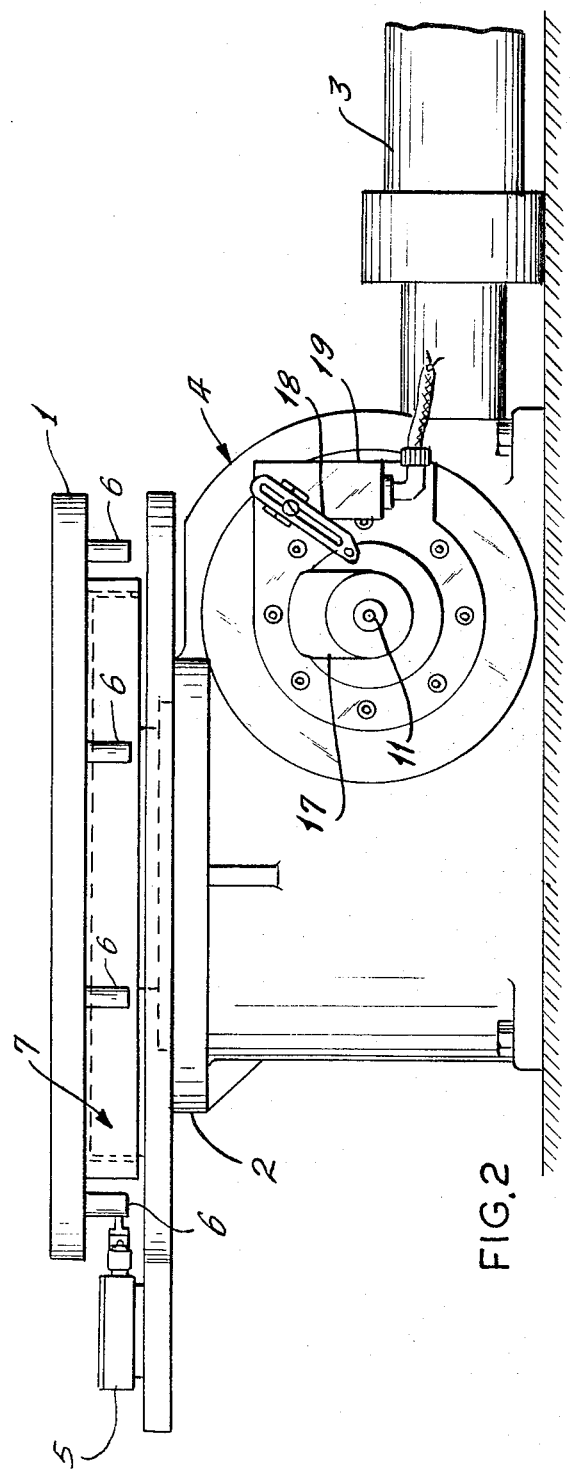
FIG. 2 provides a side view of the indexing apparatus of this invention.

In referring now to the drawings, and particularly FIGS. 1 and 2, there is generally disclosed one embodiment of this invention comprising an indexing apparatus A including a table or indexed portion 1 that is mounted for rotation upon a stationary base member 2, and which table is motivated for turning through the agency of a drive means 3. A first switch means 4, which in this case incorporates a microswitch that is actuated through the operation of a camming device, furnishes the means for reducing the speed of operation of the drive means 3 from a rapid turning of the indexing table to a slower constant speed, particulary as the table approaches the setting of a particular work station. A second switch means 5 may be mounted to the base 2, and this switch is disposed for contacting, one at a time, projections 6 extending from the table, and upon actuation of the microswitch operatively contained within the switch means 5, instantly commands the drive means to cease operation or to be braked dynamically, thereby precluding or coasting to a stop the further turning of the table. In addition, a brake means 7 which is formed through the cooperation of components mounted to both the table 1 and the base 2, may also be applied after the table has stopped to fix it in place. A mechanical component (not shown) may be mounted on table 1 and be worked upon by some form of mill, drill, or other machine tool device that may be mounted upon the stationary base of this apparatus, or in proximity therewith.

Figure 3:
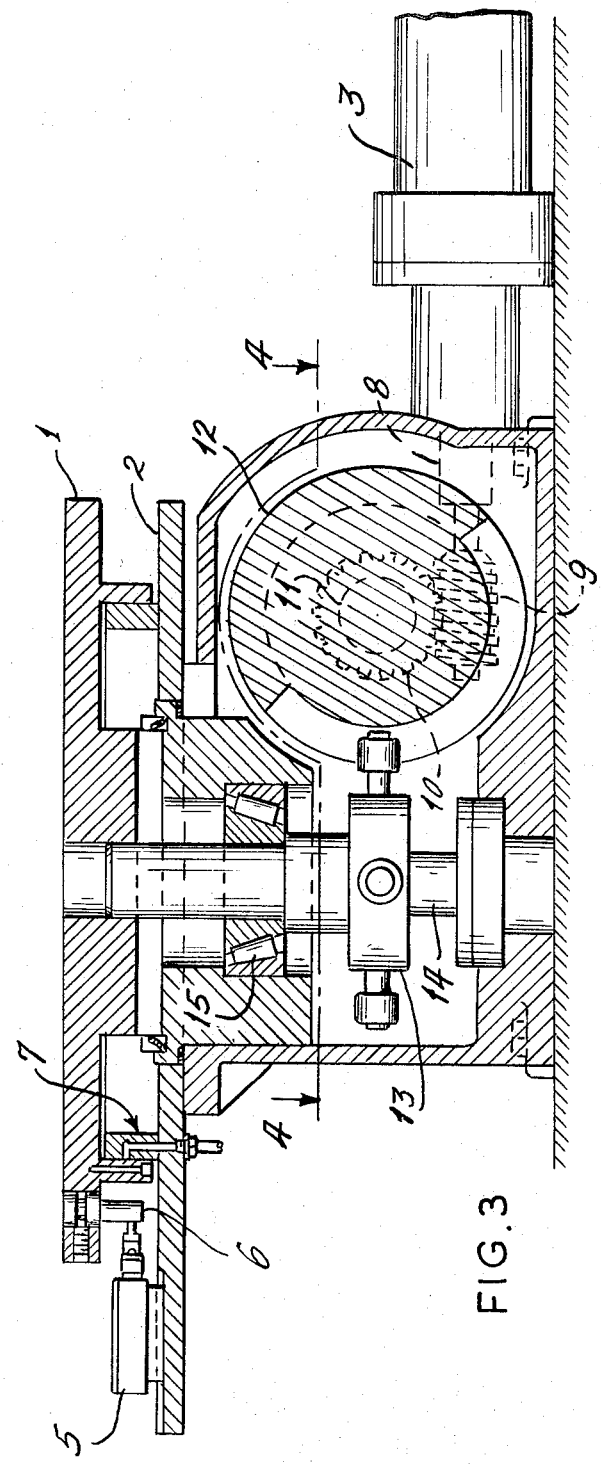
FIG. 3 provides a cross sectional view of the indexing apparatus shown in FIG. 2, disclosing the relationship of the indexing table rotatably mounted upon a base and functioning through the cooperation of a roller gear indexing drive and drive means.
Figure 4:
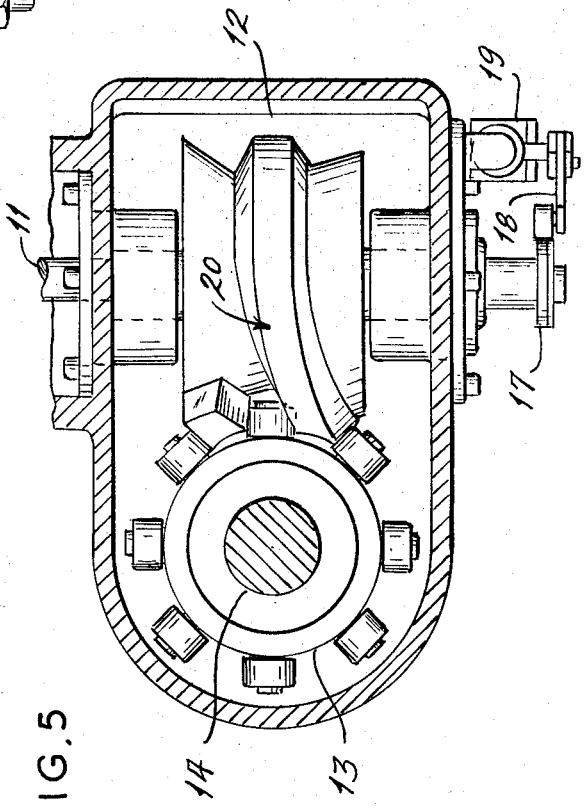
FIG. 4 provides a cross sectional view taken along the line 4—4 of FIG. 3, disclosing the indexing drive useful for providing rotation of the indexing table.

The indexing table may be of circular design, or it may be constructed in the form of a workholding belt as previously identified in a listed patent, and by referring to FIGS. 2 and 3, the cooperation between the various components that drive said table in rotation are disclosed. As shown, the drive means 3 incorporates the usual shaft 8 extending from one end thereof, and this shaft is driven in rotation by said drive means which may comprise the usual direct current motor, other form of motor-brake combination, or even some form of fluid drive means useful for this purpose. At the end of the shaft 8 there may connect the usual worm gear 9 mated with a gear wheel 10 that is mounted upon a first shaft 11, which in turn has additional indexing means, such as the cam 12, secured thereon. See also FIG. 4. Mating with the barrel or cylinder cam 12 is the roller follower 13, also part of the indexing mechanism, which is securely mounted upon a second drive shaft 14 that is supported by means of the roller bearings for rotation, as shown at 15, and to provide for turning of the indexing table 1 which is secured to its upper end thereof. Obviously, the form of drive means and cooperating drive and driven shafts, in addition to the roller gear drive, or indexing drive, that coact to provide for rotation of the indexing table 1 are shown essentially as one means for providing rotation of said turntable. Other available drive means that cooperate with various forms of indexing mechanisms could be utilized in this apparatus to furnish the turning of the table 1. Essentially, though, it is the relationship between the roller follower as intermated in the angulated cam slot of the index mechanism that creates bearing friction and mechanical friction of sufficient magnitude to coast the table to consistent stops with precision that makes this invention work, particularly when no other brake means is activated for stopping the table. It may also be remarked that the usual speed reducer 16, preferably of the anti-backlash type, may be incorporated between the drive means and the indexing mechanism, as shown in FIG. 1, to further enhance the precision operation of the apparatus.

As previously summarized in this application, the invention essentially combines two very desirable attributes into indexing, namely, a rapid speed of rotation of the table between work stations, while at the same time the capability of stopping the table precisely at a work station within very close dimensions, and this is achieved through the cooperative action of the previously mentioned switch means that act in conjunction with the indexing mechanism of this invention.

Figure 5:
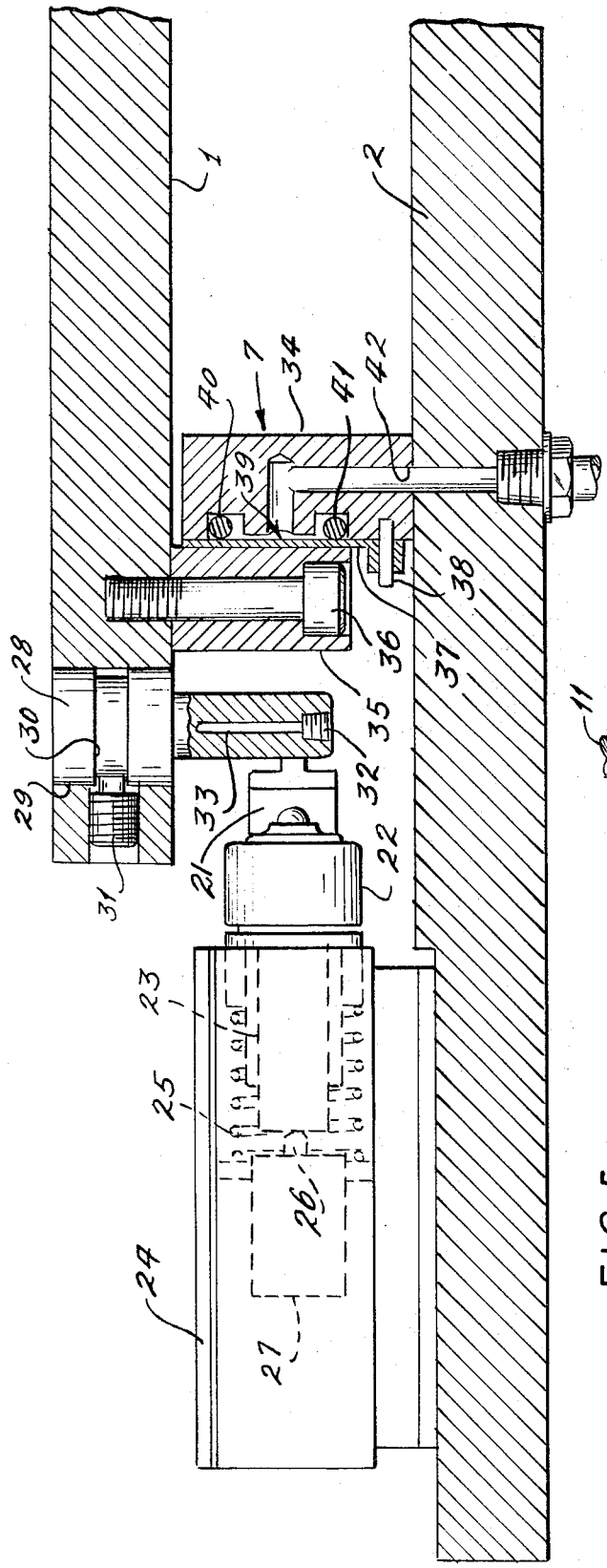
FIG. 5 provides a partial sectional view of the final positioning switch means that provides for shutoff of the drive means as when the indexing table is to be instantly stopped, precisely at a work station.

The first switch means 4 is herein disclosed as comprising a camming member 17 that is secured to one end of the first shaft 11 and this cam has contiguously riding thereon a follower arm 18, which arm is disposed for pivotal movement with respect to said cam and upon pivoting a particular degree will cause an actuation of the limit switch 19 to which it mounts. Obviously, the design of the surface of the cam 17 determines just when the follower arm 18 will reach the limit of its pivot to effect the actuation of said switch. Actuation of said first switch means 4 is predetermined to occur when the follower 13 is near and approaching the section of indexing cam 12 having a very small helix or lead angle, as at 20, (See FIG. 5) and thus imparting very slow rotation to the shaft 14 and thence to table 1. Upon actuation of the switch, the drive means 3, which may comprise a direct current motor, will be decreased in energization and cause an immediate further slowdown in the movement of the indexing table.

It might also be mentioned that the cam 12 utilized in this invention is most effective in providing the mechanical friction for a rapid stopping of the table when the cam contour helix angle is below 15°, down to a dwell angle, with the transverse axis. A helix angle above 15° may cause some back driving that results in the continued movement of the index drive, and imprecision in the setting of a work station.

As indexing cam 12 continues to rotate but now at a lesser speed, the table 1 slowly approaches the final work station position where upon arrival a second switch means 5 is actuated. Upon actuation said switch means 5 deenergizes the drive means completely letting the table 1 stop and may energize a brake means (as, for example, some form of dynamic braking) in the drive means to assist stopping. Since speeds and inertia are low and therefore coasting is minimal, only slight improvement in precision is possible by employing such a brake means in the drive means.

The formation of index cam 12 and the number of nearly equally spaced followers 13 in this index mechanism configuration determines the basic angle of arc between work stations which are eight in number as shown. To change the system to a different number of work stations, only the index cam 12 and the number of roller gears on the follower 13 need be changed.

The exact angle of arc between work stations or the table 1 is determined finally by the angular spacing of the actuating rods 6, operative upon the switch means 5.

Index cam 12 may have a contour containing a dwell or section of zero helix angle, as beyond position 20, in which case the actuating rods 6 should be adjusted to actuate the switch 5 just prior to entry of followers 13 into the dwell in order to maintain a consistent cycle pattern from one work station to the next. A preferred arrangement has the index cam 12 with a normal indexing contour for a major portion of the cycle and a near dwell or low helix angle portion for the remaining portion. This near-dwell or very slow motion section assures uniform cycle pattern, and it is during the near-dwell section that switch means 5 is actuated, the exact point of actuation again being determined finally by the angular spacing of said actuating rods 6.

By way of example, the rapid turning of the indexing table 1 has been acquired through the operation of a drive means 3, comprising a direct current motor energized at, for example, 1,000 rpm, which transfers its force through the cam 12 and followers 13 of the indexing mechanism. Upon actuation of the switch means 4, the energization of the motor is reduced by means of resistance to achieve a lower speed, previously described as the creep speed, in the turning of the indexing table, and at this slower speed the motor might be energized to operate a 70 rpm, or less. In the model of the indexing table thus far tested at these speeds, a three/fourths horsepower direct current motor has been found useful, but obviously, depending upon the size of the indexing apparatus required, the size of this motor may greatly vary.

While the indexing apparatus is operating at this creep speed, and as the table slowly turns toward the positioning of a work station, the second switch means 5 is positioned to be actuated at just near the precise moment when the table reaches that location at which it must be fixed. The switch means 5 comprises a form of slide mechanism which is positioned for contact by one of a portion extending from the table, which in this case is shown as a series of projecting rods 6 which extend downwardly from their mounting to the undersurface of the table, and in a manner which will be hereinafter described. As can be seen, a contact surface 21 is mounted to the adjustable sleeve nut 22 which is threadedly engaged upon a slide rod 23 provided extending from within the housing 24. Normally, a spring 25 urges the contact 21 to its fullest extent out of the housing 24, but upon the contact 21 entering into engagement with a projecting member 6, its slide rod 23 will be forced rearwardly into the housing 24 and contact the probe 26 of a microswitch 27. And through the adjustment of the mechanism 22, the moment that the microswitch 27 may be actuated can be set to correspond to just near the location at which it is desired to instantly discontinue any turning movement of the indexing table 1. When actuation of the microswitch 27 occurs, the drive means 3 will be deenergized, or subjected to dynamic braking by means of shorting the motor armature through resistance, and through the mechanical friction generated in the indexing drive, comprising the cam 12 and the follower 13, there immediately is a tendency to discontinue any further turning of said table.

As previously stated, the switch means 5 is designed for contacting the projecting members 6 of the invention, and each member 6 may comprise a downwardly depending rod which is formed having an enlarged upper portion 28 snugly positioned within an aperture 29 provided in the table 1. An annular groove 30 is provided around the circumference of the member 28, and a screw 31 is designed for threadedly engaging with the table and for keying within said groove to fasten the rod member in place. The depending portion of this rod member may be designed having an eccentric surface, i.e., eccentric with respect to its centerline, so that instead of adjusting the sleeve nut 22 of the switch means 5, the set screw 31 may be freed, and the member 6 pivoted to provide for a change in the moment of engagement of the contact member 21 with said member 6. This is an alternate manner in which precise adjustment may be made to provide for an exact setting of each individual work station upon the table, and just when the microswitch 27 will be actuated to provide for the locating of said work station with respect to the machine tool that will act upon the component mounted thereat. A further fine setting of each member 6 can be achieved through the turning of the threaded plug 32 within the interiorily threaded slit portion 33 of each said member. An upward threading of the plug will widen the diameter of the member 6, while a downward turning will produce the contrary result.

For clamping the table in place after it has ceased turning, a brake means 7 is also furnished to insure that the table is held at an exact location, as previously described, and within a few arc-seconds of its desired location. The brake means shown comprises a pair of projecting portions 34 and 35, with these members being formed in the shape of annular sleeves, and with the member 34 being secured rigidly to the surface of the base member 2, while the projecting member 35 is fastened, as by a series of screws, one as shown at 36, to the under surface of the table 1. These annular sleeves are maintained in proximity, and are designed to mechanically engage one another through the agency of an annular sleeve brake shim 37 that is spaced intermediate these two sleeves. This shim is fixed, as by means of a series of pins, as at 38, along its downward edge to the sleeve 34, while the portions of the shim thereabove are free for slight elastic, diametral expanding movement, principally to be urged against the side of the sleeve 35, in an operation similar to that of a brake shoe, to provide clamping to any movement of the table. To perform the foregoing operation, a cavity, as at 39, is formed intermediate the surface of the shim 37 and the surface of the sleeve 34, with the height of said cavity determined by the positioning of a pair of O-rings 40 and 41 within the grooves provided around the surface of the member 34. A channel 42 is provided for communicating a fluid means from a source (not shown) to this cavity 39, and when said fluid is subject to pressure, it obviously urges the shim 37 against the surface of the sleeve 35 to effect braking and fix the table in place. Any standard form of fluid means, in the nature of pneumatics or hydraulics, and which may be subjected to pressure, is useful for actuation of this brake means.

Figure 6:
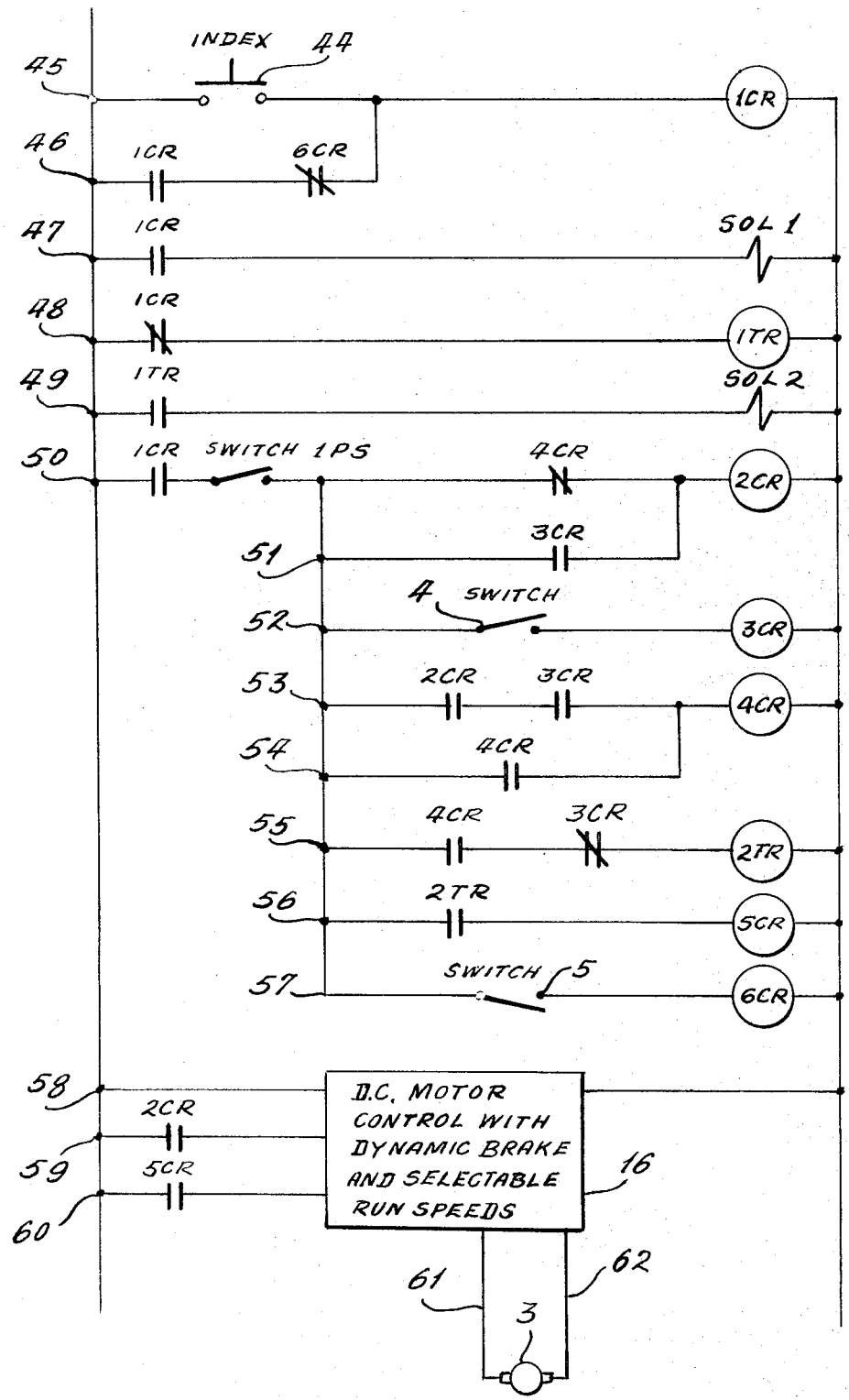
FIG. 6 provides an exemplary circuit diagram of one embodiment of this invention.

An example of the type of step by step operating circuitry that may be useful for coordinating the functioning of the various switch means of this invention, in addition to the energization of the drive means 3, and perhaps the actuation of the brake means 7, is shown in the ladder diagram in FIG. 6. It is to be noted from the schematic FIG. 1 that a panel control box 43 may be provided for holding most of the various relays, or the like, useful for providing coordinated and timed operation of the various mechanical components of this invention. In the circuit diagram, a switch 44, as along circuit line 45, may be provided for operation of a cycle relay 1CR to initiate a cycle of this apparatus, and the switch may be initially manually depressed into closure, or it may be automatically operated from a timer so as to initiate operation of the apparatus automatically after completion of a just previous cycle, and after a lapse of a predetermined period of time. This period of time may be of a length to provide for the performance of a particular machining operation upon a work piece mounted upon the turntable, as previously described.

It should be noted that in this ladder circuit diagram, that the operation of the relay 1CR, as along circuit line 45, also effects the operation of its contacts shown in the circuitry of this invention along circuit lines 46, 47, 48 and 50. Upon actuation of contact 1CR along circuit line 46, the normally closed 6CR holds and fixes the 1CR contacts closed during this initial portion of an index cycle. Along circuit line 47, the now closed 1CR contact provides for actuation of the solenoid SOL 1, which opens the clamp or holding means 7 previously fixing the turntable in place. The relay contact 1CR along circuit line 48, which is normally closed, now becomes opened which discontinues the operation of the timer 1TR, and this opens the relay contact 1TR, as along circuit line 49, which deenergized the solenoid SOL 2 and the aforesaid holding means 7. In addition, the relay contact 1CR along circuit line 50 is now closed, and the pressure switch 1PS, which is normally held open while the holding means has fixed the table in place, gradually closes to provide for energization of the relay 2CR also arranged along circuit line 50, the charge having passed through the normally closed 4CR relay along said line 50. Upon actuation of the relay 2CR, it can be seen, as along circuit line 59, that the direct current motor 3 is now energized for high speed movement through the motor control 16. It should also be noted that upon energization of the relay 2CR, that its contacts along circuit line 53 are also closed. Then, upon the actuation of the relay 3CR, as along circuit line 52, which occurs due to the mechanical actuation of the cam limit switch 4, the relay 4CR, as along circuit line 53, becomes energized, with the relay contacts of 4CR along the circuit line 50 becoming opened, and the relay contacts 4CR along the circuit lines 54 and 55 becoming closed. The relay timer 2TR now becomes energized, providing for a period of time for the direct current motor control to provide for dynamic braking of the D.C. motor 3, which brings the turntable to a stop, and then immediately provides for actuation of the relay contacts 2TR, as along circuit line 60, to provide for a slow speed operation of the D.C. motor, effecting a creep speed in the turning of the turntable. Then, as the position switch 5 is physically actuated, as along circuit line 57, the circuit relay 6CR becomes actuated, which provides for a total deenergization of the D.C. motor, and this occurs by means of the normally closed contact of relay 6CR, as along circuit line 46, now become opened, which deactivates the circuit relay 1CR. When this occurs, the previously opened contact of relay 1CR arranged in circuit line 48 now becomes closed, which initiates the timer relay 1TR, also along circuit line 48, providing for closure of its contact 1TR along circuit line 49, which provides for energization of solenoid SOL 2 providing for the brake or holding means 7 to fix the now stopped turntable in place. After a predetermined period of time, a period of time during which a machining component may complete a machining operation upon an item mounted on the turntable, the index switch 44 may be closed providing for a repeat of the aforesaid cycle of operation. It should be noted that the charge from the motor control is conducted to the D.C. motor through circuit lines 61 and 62.

The invention described in the summary of this application is analyzed as comprising an indexing apparatus generally, rather than only of the turntable variety. As described, the invention incorporates the principle of variable speed in the drive of an indexing apparatus, and more specifically, the movement of the apparatus being furnished through a drive means in the nature of a motor, or the like, that turns an indexing mechanism in the nature of a cam and follower combination. As shown in the previously mentioned U.S. Pat. No. 3,636,783, the drive means 3 and indexing mechanisms 12 and 13 of this invention may provide turning movement of the drum means of this disclosed patent, with the various switch means, and particularly the switch means 5 of this invention which coacts with the extending portions 6 can be incorporated into the operation of said drum means to furnish the same sequential operations to the carrier mechanism disclosed in said patent. The disclosure of this previous patent is incorporated within this application for purposes of analyzing the breadth of application of this invention. In addition, and as also set forth previously, the invention shown in U.S. Pat. No. 3,682,005, upon a double cam drive, which is useful for moving work supporting pallets generally in a lineal direction can also incorporate the principles of this invention. For example, the double cam drive disclosed in this United States patent can be driven through variable speeds, essentially at a quick speed when moving the work supporting pallets generally between work stations, but then enter into a creep speed as a first switch, such as the switch 4 of this invention, is actuated, with the drive means and the double cam drive means being denergized as when any extending portion from the disclosed pallets may actuate a second switch, such as the switch means 5 of this invention, so as to instantly stop the movement of the pallet precisely at a work station. These are illustrative of the variety and extend of uses of the principles of this invention.

Numerous variations in the construction of this indexing apparatus may occur to those skilled in the art in light of the foregoing disclosure. Essentially, the principle of this invention is the provision of means to provide for both speed of operation of an indexing apparatus, while at the same time maintaining accuracy to extremely close tolerances, and all being achieved automatically, without manual participation. Obviously, other forms of switching means than that which may be operated by a cam and follower combination, as shown at 4, or from a slide type contact for operating a microswitch as shown as the switch means 5, could be substituted to provide for precise operation of a drive means as disclosed. The description of the preferred embodiment is provided for illustrative purposes, and all equivalent means for achieving the results of this invention and which are encompassed within the spirit and scope of the appended claims are to be protected.

Having thus described the invention, claimed and desired to be secured by Letters Patent is: it has

1. A variable speed indexing apparatus of the type provided for first rapid movement of a work supporting member generally between predetermined work stations, with a reduction in the speed of movement of said work supporting member as it approaches a work station in preparation for its complete stoppage at a precisely set location, an indexing drive connected for moving said work supporting member, drive means operatively coupled for rotating said indexing drive, a stationary base supporting said work supporting member for movement, switch means which upon actuation providing for a sequential reduction in the speed of movement of said work supporting member and its complete stoppage at a precise work station, said apparatus includes an indexed portion mounting said work supporting member and being movably mounted upon the stationary base, braking means cooperating with said stationary base and the indexed portion to secure said portion in place and after it has arrived at a precise work station, said braking means includes a first member connected to said base, a second member secured to said indexed portion and maintained in proximity with said first member, shiftable means attaching to said first member and disposed for being urged into contact with said second member to fix said indexed portion with respect to its base, said first member being formed as an annular sleeve rigidly secured to said stationary base, said second member also being formed as an annular sleeve and secured to said indexed portion and maintained proximate and concentric with said first sleeve, said shiftable means comprising a shim shiftably fixed to said first sleeve and capable of being urged into contact with said second sleeve to fix the positioning of said indexed portion.

2. The invention of claim 1 and including a fluid substance communicating with said shim and provided for urging said shim into braking contact with said second sleeve.

3. The invention of claim 1 wherein said shim at one edge being rigidly rixed to said first sleeve, a pair of O-rings mounted surrounding said first sleeve intermediate its surface and the contiguous shim thereby forming a cavity between said rings, shim, and the first sleeve surface, a conduit provided through said sleeve and communicating with said cavity, and a fluid substance provided in said cavity and when subjected to pressure urging said shim into braking contact with said second sleeve.

4. The invention of claim 3 wherein said fluid substance comprises air.

5. The invention of claim 3 wherein said fluid substance comprises a hydraulic composition capable of withstanding pressure.

6. The invention of claim 1 and including timing means providing for the re-activation of said drive means and reinitiation of the rapid movement of said indexing work supporting member after completion of a machine tool function at a work station.

7. A variable speed indexing apparatus of the type incorporating a drive means for inducing a first rapid movement of at least one work supporting member between predetermined work stations, with a reduction in the speed of movement of said work supporting member as it approaches a work station in preparation for its complete stoppage at a precise location through the agency of its indexing drive comprising, a stationary base supporting said work supporting member for movement, a drive shaft connecting to said work supporting member and disposed for simultaneous rotation therewith, an indexing roller gear drive connected for moving said work supporting member and drive shaft and being driven by said drive means, said indexing drive incorporating a cam means and roller follower hub combination in which the cam grooves are designed to approach a period of dwell as the work supporting member approaches the position of a predetermined work station, said follower hub being connected concentrically with the drive shaft, said cam means providing for indexed movement of the drive shaft and the work supporting member through the cooperating follower hub, switch means which upon actuation providing for a sequential reduction in the speed of movement of said drive shaft and work supporting member, said switch means includes a first switch means, said first switch means including another cam coupled for revolving in unison with the movement of said indexing drive, a follower contacting said cam, said first switch means responsive to the positioning of said follower and upon actuation providing for the initial change in the speed of movement of said indexing apparatus, said work supporting member being provided with at least one extension projecting therefrom, a second switch means mounted upon said stationary base and positioned for engagement with said extension to provide for actuation of its switch and instantaneous interruption in the turning of said work supporting member through a curtailment of the operation of the cam means of the indexing drive.

8. The invention of claim 7 wherein each extension comprises a projecting rod connecting to said working supporting member, said second switch means incorporating a slidable contact disposed for engagement with said rod and upon shifting of the slidable contact providing for actuation of its switch and instant stoppage in the movement of said work supporting member.

9. The invention of claim 8 wherein said projecting rod is formed having an eccentric surface with respect to its central axis, a removable fastener securing said rod to the indexed portion, upon loosening of said fastener said rod is capable of being pivoted to provide for its repositioning and corresponding resetting in the precise operation of said second switch means.

10. The invention of claim 9 wherein said slidable contact is spring biased into static position, and said contact upon engaging said positioned rod being urged against the bias of its spring for actuation of its switch.

11. The invention of claim 7 wherein said work supporting member comprises an indexing table.

12. The invention of claim 8 wherein said projecting rod is adjustable to provide for its resetting and the precise operation of said second switch means during its engagement with said projecting rod.

13. A variable speed indexing apparatus of the type having an indexed portion mounted upon a stationary base, said indexed portion including at least one work supporting member, a drive means for inducing a first rapid movement of said work supporting member between predetermined work stations, with a reduction in the speed of movement of said work supporting member as it approaches a work station in preparation for its complete stoppage at a precise location through the agency of its indexing drive and comprising, said stationary base supporting said work supporting member for movement, a drive shaft connecting to said work supporting member and disposed for simultaneous rotation therewith, an indexing roller gear drive connected for moving said work supporting member and drive shaft and being driven by said drive means, said indexing drive incorporating a cam means and roller follower hub combination in which the cam grooves are designed to approach a period of dwell as the work supporting member approaches the position of a predetermined work station, said follower hub being connected concentrically with the drive shaft, said cam means providing for indexed movement of the drive shaft and the work supporting member through the cooperating follower hub, switch means which upon actuation providing for a sequential reduction in the speed of movement of said drive shaft and work supporting member and then a deenergization in the operation of the drive means thereby inducing the indexing drive to precisely position and curtail further movement of the work supporting member at the location of a work station, and braking means cooperating with said stationary base and the indexed portion to secure said portion in place after it has arrived at a precise work station.

14. The invention of claim 13 wherein said braking means includes a first member connected to said base, a second member secured to said indexed portion and maintained in proximity with said first member, and shiftable means attached to said first member and disposed for being urged into contact with said second member to fix said indexed portion with respect to its base.

15. A variable speed indexing apparatus of the type having an indexed portion mounted upon a stationary base, said indexed portion including at least one work supporting member, a drive means for inducing a first rapid movement of said work supporting member between predetermined work stations, with a reduction in the speed of movement of said work supporting member as it approaches a work station in preparation for its complete stoppage at a precise location through the agency of its indexing drive and comprising, said stationary base supporting said work supporting member for movement, a drive shaft connecting to said work supporting member and disposed for simultaneous rotation therewith, an indexing roller gear drive connected for moving said work supporting member and drive shaft and being driven by said drive means, said indexing drive incorporating a cam means and roller follower hub combination in which the cam grooves are designed to approach a period of dwell as the work supporting member approaches the position of a predetermined work station, said follower hub being operatively associated with the drive shaft, said cam means providing for indexed movement of the drive shaft and the work supporting member through the cooperating follower hub, switch means which upon actuation providing for a sequential reduction in the speed of movement of said drive shaft and work supporting member and then a de-energization in the operation of the drive means thereby inducing the indexing drive to precisely position and curtail further movement of the work supporting member at the location of a work station, and braking means cooperating with said stationary base and the indexed portion to secure said portion in place after it ha s arrived at a precise work station.

16. The invention of claim 15 wherein said braking means comprises the mechanical friction generated in the indexing roller gear drive during deenergization of said drive means.

* * * * *